US012417541B2

(12) United States Patent
Hwang et al.

(10) Patent No.: US 12,417,541 B2
(45) Date of Patent: Sep. 16, 2025

(54) METHOD AND DEVICE FOR TRAINING GENERATIVE ADVERSARIAL NETWORK FOR CONVERTING BETWEEN HETEROGENEOUS DOMAIN DATA

(71) Applicants: AJOU UNIVERSITY INDUSTRY-ACADEMIC COOPERATION FOUNDATION, Suwon-si (KR); INCHEON NATIONAL UNIVERSITY RESEARCH & BUSINESS FOUNDATION, Incheon (KR)

(72) Inventors: Won Jun Hwang, Seoul (KR); Hyung Ho Kim, Gyeonggi-do (KR); Hyeon Cho, Jeollanam-do (KR); Ouk Choi, Incheon (KR)

(73) Assignees: AJOU UNIVERSITY INDUSTRY-ACADEMIC COOPERATION FOUNDATION, Suwon-si (KR); INCHEON NATIONAL UNIVERSITY RESEARCH & BUISNESS FOUNDATION, Incheon (KR)

( * ) Notice: Subject to any disclaimer, the term of this patent is extended or adjusted under 35 U.S.C. 154(b) by 1077 days.

(21) Appl. No.: 17/082,148

(22) Filed: Oct. 28, 2020

(65) Prior Publication Data
US 2021/0192343 A1    Jun. 24, 2021

(30) Foreign Application Priority Data
Dec. 24, 2019 (KR) .................. 10-2019-0174105

(51) Int. Cl.
*G06T 7/11* (2017.01)
*G06F 18/214* (2023.01)
(Continued)

(52) U.S. Cl.
CPC .............. *G06T 7/11* (2017.01); *G06F 18/214* (2023.01); *G06N 3/045* (2023.01); *G06N 3/08* (2013.01);
(Continued)

(58) Field of Classification Search
CPC .................................. G06N 3/08; G06N 3/045
See application file for complete search history.

(56) References Cited

FOREIGN PATENT DOCUMENTS

KR    10-2018-0120478 A    11/2018

OTHER PUBLICATIONS

Huang, "AugGAN: Cross Domain Adaptation with GAN-based Data Augmentation", 2018 (Year: 2018).*
(Continued)

*Primary Examiner* — Van C Mang
(74) *Attorney, Agent, or Firm* — Sughrue Mion, PLLC (57) ABSTRACT

Provided is a method of training a generative adversarial network (GAN) for converting between heterogeneous domains, the method including training a first GAN and a second GAN with at least one unpaired training data set comprised of a training image of a first domain and a training image of a second domain; using the trained first GAN to convert a first image of the first domain to an image of the second domain; using the trained second GAN to reconvert the converted image of the second domain to a second image of the first domain; and performing segmentation on at least one of the first image of the first domain, the converted image of the second domain, or the reconverted second image of the first domain.

9 Claims, 10 Drawing Sheets

(51) Int. Cl.
*G06N 3/045* (2023.01)
*G06N 3/08* (2023.01)
*G06T 5/50* (2006.01)
*G06T 7/168* (2017.01)
*G06V 10/774* (2022.01)
*G06V 10/82* (2022.01)
*G06V 20/69* (2022.01)

(52) U.S. Cl.
CPC ................ *G06T 5/50* (2013.01); *G06T 7/168* (2017.01); *G06V 10/774* (2022.01); *G06V 10/82* (2022.01); *G06V 20/695* (2022.01)

(56) References Cited

OTHER PUBLICATIONS

Yuan Xue, "SegAN: Adversarial Network with Multi-scale L1 Loss for Medical Image Segmentation", 2018 (Year: 2018).*

Zak Murez et al., Image to Image Translation for Domain Adaptation, 11 pages, published in 2018 IEEE/CVF Conference on Computer Vision and Pattern Recognition, Date of Conference Jun. 18-23, 2018.

* cited by examiner

METHOD AND DEVICE FOR TRAINING GENERATIVE ADVERSARIAL NETWORK FOR CONVERTING BETWEEN HETEROGENEOUS DOMAIN DATA

CROSS-REFERENCE TO RELATED APPLICATION

This application claims the benefit of Korean Patent Application No. 10-2019-0174105, filed on Dec. 24, 2019, in the Korean Intellectual Property Office, the disclosures of which are incorporated herein in its entirety by reference.

BACKGROUND

1. Field

The disclosure relates to a neural network for converting between heterogeneous domain data, and more particularly, to a method of training a generative adversarial network (GAN).

2. Description of the Related Art

This section is to simply provide background information for a technological idea of the disclosure, but does not constitute the conventional technology.

An artificial intelligence (AI) system is a computing system where a machine becomes smarter by learning and making decisions on its own unlike existing rule-based smart systems. As the AI system may have a better recognition rate and more accurately figure out tastes of a user the more the AI system is used, the existing rule-based smart system is being gradually replaced by a deep-learning based AI system.

The AI system is used in various areas. For example, linguistic understanding is a technique for recognizing and applying/processing a human language/text, including natural language processing, machine translation, a dialog system, question and answering, voice recognition/synthesis, etc. Visual understanding is a technique for recognizing and processing an object like human vision does, which includes object recognition, object tracking, image retrieval, person recognition, scene understanding, spatial understanding, image enhancement, etc. Inferential prediction is a technique for determining information and making a logical inference and prediction from the determination, and includes knowledge/probability based inference, optimized prediction, preference based scheduling, recommendations, etc. Knowledge representation is a technique for automating human experience information into knowledge data, including knowledge building (data creation/classification), knowledge management (data utilization), etc. Operation control is a technique for controlling autonomous driving of a vehicle or robot motions, including motion control (navigation, collision, and driving), manipulation control (behavior control), etc.

In general, the AI system is provided based on machine learning. The machine learning refers to an algorithmic technique for classifying/learning features of input data on its own, and an algorithm for the machine learning is implemented using various types of neural network.

Various researches have recently been conducted through various types of neural network, and there are continued attempts to develop a method of increasing accuracy and operation efficiency of a neural network that performs non-supervised learning, such as a generative adversarial network (GAN) in particular.

SUMMARY

An objective of the disclosure is to provide a method of training a generative adversarial network (GAN) for converting between heterogeneous domains.

The objective of the disclosure is not limited thereto, and it is obvious to those of ordinary skill in the art that unmentioned other objectives will be clearly appreciated from the following description.

According to an aspect of the inventive concept, a method of training a generative adversarial network (GAN) for converting between heterogeneous domains, the method comprising: training a first GAN and a second GAN with at least one unpaired training data set comprised of a training image of a first domain and a training image of a second domain; using the trained first GAN to convert a first image of the first domain to an image of the second domain; using the trained second GAN to reconvert the converted image of the second domain to a second image of the first domain; and performing segmentation on at least one of the first image of the first domain, the converted image of the second domain, or the reconverted second image of the first domain, wherein, the training of the first GAN and the second GAN is controlled according to a loss function based on a result of the segmentation performed.

According to an exemplary embodiment, the performing of the segmentation comprises performing segmentation on the first image of the first domain and the converted image of the second domain, and wherein the loss function comprises a function which considers a first result of comparison between a result of segmentation of the first image of the first domain and a result of segmentation of the converted image of the second domain.

According to an exemplary embodiment, the training of the first GAN and the second GAN comprises controlling training of the first GAN and the second GAN to increase a difference between the result of segmentation of the first image of the first domain and the result of segmentation of the converted image of the second domain.

According to an exemplary embodiment, the training of the first GAN and the second GAN comprises controlling training of the first GAN and the second GAN by additionally considering a loss function of at least one of the first GAN or the second GAN.

According to an exemplary embodiment, the performing of the segmentation comprises performing segmentation on the first image of the first domain and the reconverted second image of the first domain, and wherein the loss function comprises a function which considers a second result of comparison between a result of segmentation of the first image of the first domain and a result of segmentation of the reconverted second image of the first domain.

According to an exemplary embodiment, the training of the first GAN and the second GAN comprises controlling training of the first GAN and the second GAN to reduce a difference between the result of segmentation of the first image of the first domain and the result of segmentation of the reconverted second image of the first domain.

According to an exemplary embodiment, the training of the first GAN and the second GAN comprises controlling training of the first GAN and the second GAN not to apply a loss function based on a result of comparison between the first image of the first domain and the reconverted second image of the first domain.

According to an exemplary embodiment, the performing of the segmentation comprises performing the segmentation using a segmentation network adapted to the first domain and the second domain.

According to an exemplary embodiment, the performing of the segmentation comprises performing segmentation on the first image of the first domain, the converted image of the second domain, and the reconverted second image of the first domain, and wherein the loss function comprises a function which considers both a first result of comparison between a result of segmentation of the first image of the first domain and a result of segmentation of the converted image of the second domain, and a second result of comparison between a result of segmentation of the first image of the first domain and a result of segmentation of the reconverted second image of the first domain.

According to an exemplary embodiment, the training of the first GAN and the second GAN comprises controlling training of the first GAN and the second GAN to increase a difference between the result of segmentation of the first image of the first domain and the result of segmentation of the converted image of the second domain and reduce a difference between the result of segmentation of the first image of the first domain and the result of segmentation of the reconverted second image of the first domain.

According to an exemplary embodiment, the first GAN and the second GAN correspond to CycleGAN.

According to an exemplary embodiment, the first GAN and the second GAN each comprise a generator and a discriminator, and wherein the first GAN and the second GAN are the same.

According to an aspect of the inventive concept, a device for controlling a generative adversarial network (GAN) for converting between heterogeneous domains, the device comprising: a memory; and a processor configured to train the GAN with an unpaired training data set comprised of a training image of a first domain and a training image of a second domain, convert a first image of the first domain to an image of the second domain by using the trained GAN, and perform segmentation on at least one of an image of the first domain or an image of the second domain, wherein the processor is further configured to control training of the GAN according to a loss function based on a result of the segmentation performed.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Various modifications may be made to embodiments of the disclosure, which will be described more fully hereinafter with reference to the accompanying drawings. The disclosure may be embodied in many different forms and should not be construed as limited to the embodiments of the disclosure set forth herein; rather, these embodiments of the disclosure are provided so that the disclosure will be thorough and complete, and will fully convey the scope of the disclosure to those of ordinary skill in the art.

If it is determined that a detailed description of commonly-used technologies or structures related to the embodiments of the disclosure may unnecessarily obscure the subject matter of the disclosure, the detailed description will be omitted. Ordinal numbers (e.g., first, second, etc.) as herein used are to distinguish components from one another.

When the term "connected" or "coupled" is used, a component may be directly connected or coupled to another component. However, unless otherwise defined, it is also understood that the component may be indirectly connected or coupled to the other component via another new component.

The terms "unit", "device", "~er (~or)", "module", etc., refer to a processing unit of at least one function or operation, which may be implemented by hardware such as a processor, a microprocessor, an application processor, a micro controller, a central processing unit (CPU), a graphics processing unit (GPU), an accelerate processor unit (APU), a digital signal processor (DSP), an application specific integrated circuit (ASIC), a field programmable gate array (FPGA), etc., software, or a combination of hardware and software.

Throughout the specification, components may be discriminated by their major functions. For example, two or more components as herein used may be combined into one, or a single component may be subdivided into two or more sub-components according to subdivided functions. Each of the components may perform its major function and further perform part or all of a function served by another component. In this way, part of a major function served by each component may be dedicated and performed by another component.

Embodiments of the disclosure will now be described in detail.

Figure 1:
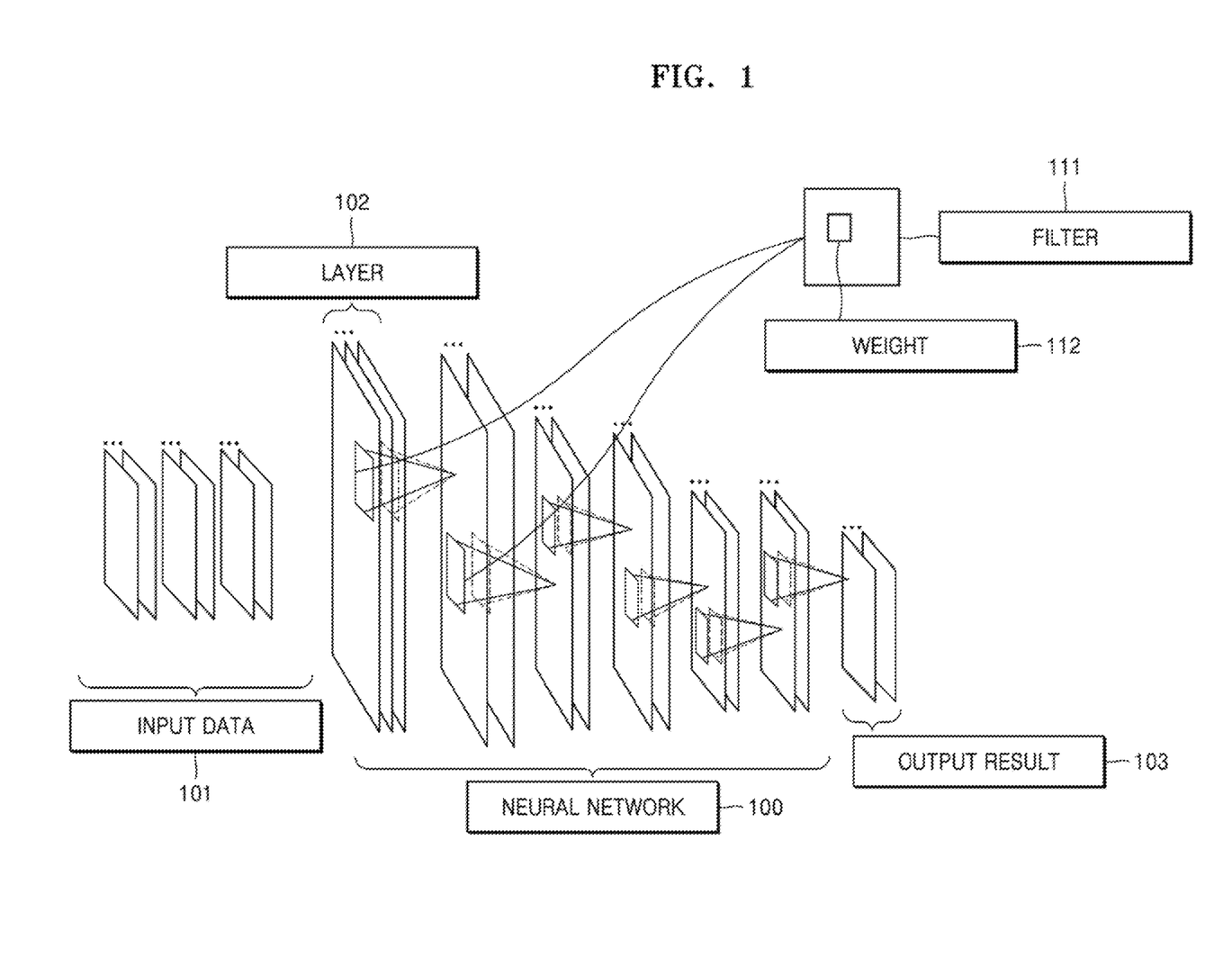
FIG. 1 is a view for describing an input data processing method using a neural network.
Figure 2:
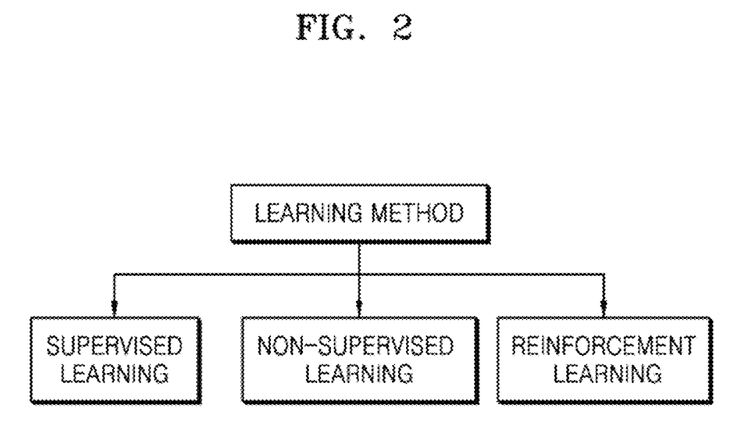
FIG. 2 is a view for describing a learning method of a neural network.

FIGS. 1 and 2 are views for describing an input data processing method using a neural network.

A neural network has recently been used for a device to attain highly accurate determination results through image processing. The neural network has a similar structure to a human neural network, and is also referred to as a deep neural network. The neural network may include a convolutional neural network (CNN), a recurrent neural network (RNN), a deep belief network, a restricted Boltzman machine, a generative adversarial network (GAN), etc., without being limited thereto.

Referring to FIG. 1, the device may obtain input data 101. The input data 101 may be an input feature map. Furthermore, the input data 101 may include not only data of various images but also text data, video data, etc., without being limited thereto.

In an embodiment of the disclosure, a device using an artificial intelligence (AI) system may process the input data 101 through a neural network 100. The neural network 100 may include a plurality of layers 102. Each of the layers 102 may generate an output result by applying a filter 111 including a weight 112 to the input data 101.

In an embodiment of the disclosure, the output result may be an output feature map. Each of the layers 102 may generate at least one feature map, and apply at least one filter 111 to at least one input data. Weights 112 included in the respective filters 111 may be updated by training the neural network 100.

The filter 111 may refer to a matrix having the weight 112 used to process the input data 101. The filter 111 may be, for example, a low-pass filter for canceling noise, a Gaussian filter for smoothing out edges, or a high-pass filter for sharpening edges, and the filter 111 may also be referred to as a kernel or a mask, meaning a value to be applied when processing for extracting a feature of input data is performed. The weight 112 of the filter 111 may be changed depending on which feature to be extracted from the input data.

In an embodiment of the disclosure, a first layer of the neural network 100 may generate a first feature map by operating a filter and the input data 101, and a second layer of the neural network 100 may generate a second feature map by operating the first feature map and a filter. It is, of course, not limited thereto.

The neural network 100 may process the input data 101 to increase accuracy in determination or increase a success rate of a target task. The neural network 100 may perform more accurate determination based on an output result 103 by processing the input data 101 through the plurality of layers. In addition, before outputting an output signal, the neural network 100 may perform a pooling operation to simplify the output signal.

FIG. 2 is a view for describing a learning method of a neural network.

As described above, there may be various types of neural network, and learning of the neural network may be classified into supervised learning, non-supervised learning, and reinforcement learning.

The supervised learning may refer to learning performed while there is an explicit answer provided. For example, given numerous images of cats and dogs, the supervised learning is performed in the manner of giving an answer to whether each image is about a cat or a dog, enabling an image to be distinguished whether it is about a cat or a dog when the image is input to the neural network.

In an embodiment of the disclosure, the purpose of the supervised learning may be classification and regression. Classification may refer to classifying certain data into a finite number of proper classes, and regression may refer to predicting successive values based on features of the data. A representative neural network for supervised learning is a CNN.

Non-supervised learning may refer to learning performed while there is not an explicit answer provided. For example, given images of animals composed of cats and dogs, the non-supervised learning is performed in the manner of figuring out a feature of data and sorting out similar images (e.g., classifying into cat images and dog images) even without a correct answer provided, enabling the neural network to classify the input images.

In an embodiment of the disclosure, purposes of the non-supervised learning may be clustering, visualization, dimension reduction, etc. Clustering is to discriminate an image, dimension reduction is to extract a feature to simplify data, and visualization refers to making a two dimensional (2D) or three dimensional (3D) representation that may be put into the form of a diagram. A representative neural network for non-supervised learning is a GAN.

Reinforcement learning refers to an agent observing an environment, executing an action, receiving a reward, and learning a best strategy called a policy on its own to get the biggest rewards over time. For example, the AlphaGo® program from DeepMind may be an example of the reinforcement learning.

In the disclosure, a method of training for conversion between heterogeneous domain data using a neural network for non-supervised learning, a GAN, will be described. The GAN and CycleGAN will now be described in detail.

Figure 3:
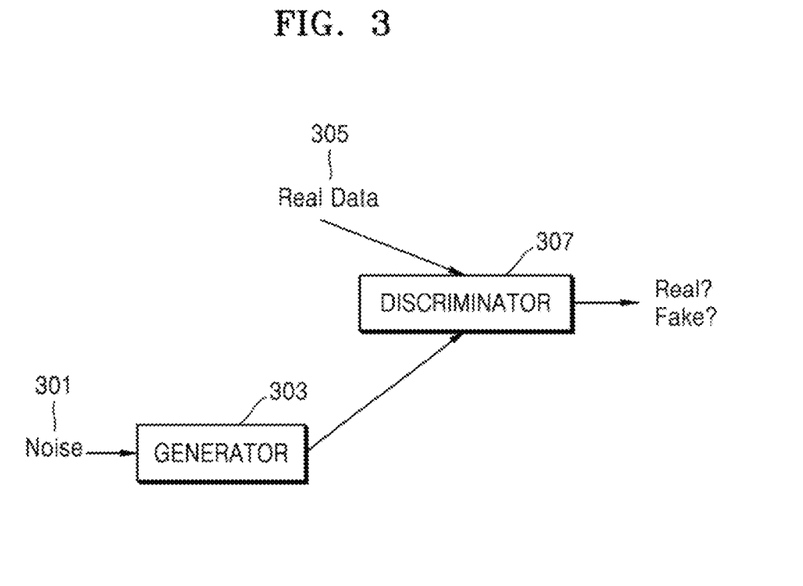
FIG. 3 is a diagram for describing a generative adversarial network (GAN), according to an embodiment of the disclosure.

FIG. 3 is a diagram for describing a GAN, according to an embodiment of the disclosure.

A GAN is a network comprised of a generative network 303 (a generative model) and a discriminative network 307 (a discriminative model), and refers to a non-supervised learning based neural network where the generative network 303 and the discriminative network 307 learn antagonistically from each other.

Referring to FIG. 3, real data 305 and data generated based on noise 301 input to the generative network 303 are input to the discriminative network 307, which in turn discriminates whether the input data is the real data 305 or the data generated by the generative network 303.

Learning of the overall GAN is performed such that the discriminative network 307 learns to accurately determine whether the input data is the real data 305 or the data generated by the generative network 303 while the generative network 303 learns to generate data similar to the real data 305 to such an extent that the discriminative network 307 fails to discriminate between them. In other words, learning of the overall GAN may be performed by antagonistic learning between the generative network 303 and the discriminative network 307.

A loss function of the GAN may be set such that the discriminative network 307 outputs a probability value approximate to one when the real data 305 is entered and outputs a probability value approximate to zero when fake data is entered, and may be set such that the discriminative network 307 outputs a probability value approximate to one when the data generated by the generative network 303 is entered to the discriminative network 307.

Figure 4:
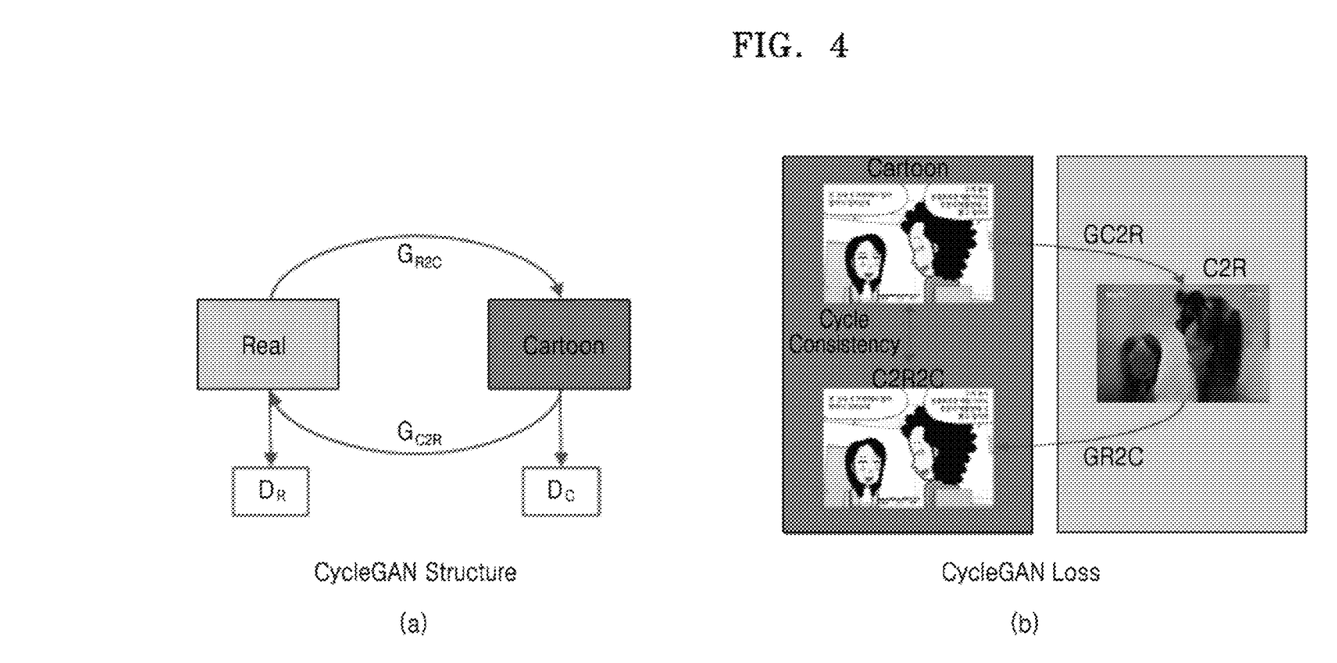
FIG. 4 is a view for describing CycleGAN, according to an embodiment of the disclosure.

FIG. 4 is a view for describing CycleGAN, according to an embodiment of the disclosure.

Basically, a lot of training data is required to improve performance of a neural network. For this, multiple data sets are composed and shared. However, to learn conversion between heterogeneous domain data, a large volume of paired data may be required. For example, to train a neural network for converting a cartoon to a real picture, a lot of paired data between cartoons and real pictures may be required. It may be, however, difficult and expensive to obtain the paired data. Furthermore, the paired data itself may not be present. Accordingly, CycleGAN has been developed to train data conversion between heterogeneous domains with unpaired data.

Referring to a structure of the CycleGAN as shown in (a) of FIG. 4, $G_{R2C}$ may be a network for converting a real picture to a cartoon and $G_{C2R}$ may be a network for converting a cartoon to a real picture. DR and Dc are networks for discriminating a real picture domain and a cartoon domain, respectively.

As the basic structure of the GAN that learns to fool the discriminative network for the opposite domain is applied, $G_{R2C}$ may perform antagonistic learning from the Dc and $G_{C2R}$ may perform antagonistic learning from the DR.

In this case, however, as there are no paired image with the input cartoon image, the CycleGAN may change the input cartoon image to a real picture, which is not related at all, so the conversion accuracy may become very low. Hence, unlike the GAN, an additional loss function may be applied for the CycleGAN. This is called cycle consistency.

Referring to CycleGAN loss as shown in (b) of FIG. 4, learning may be performed by not simply mapping a cartoon domain image to a real picture domain image but applying the cycle consistency, which is a constraint to even consider consistency after reconversion, to the CycleGAN. This is to control the neural network to perform accurate conversion between domains by reconverting the converted data to keep consistency because there are not correctly paired data.

However, to perform segmentation on heterogeneous domain data using the CycleGAN, extra learning may be required. Accordingly, the disclosure provides a method of efficiently controlling learning of the CycleGAN to accurately perform conversion between heterogeneous domain data and segmentation of the converted data.

Figure 5:
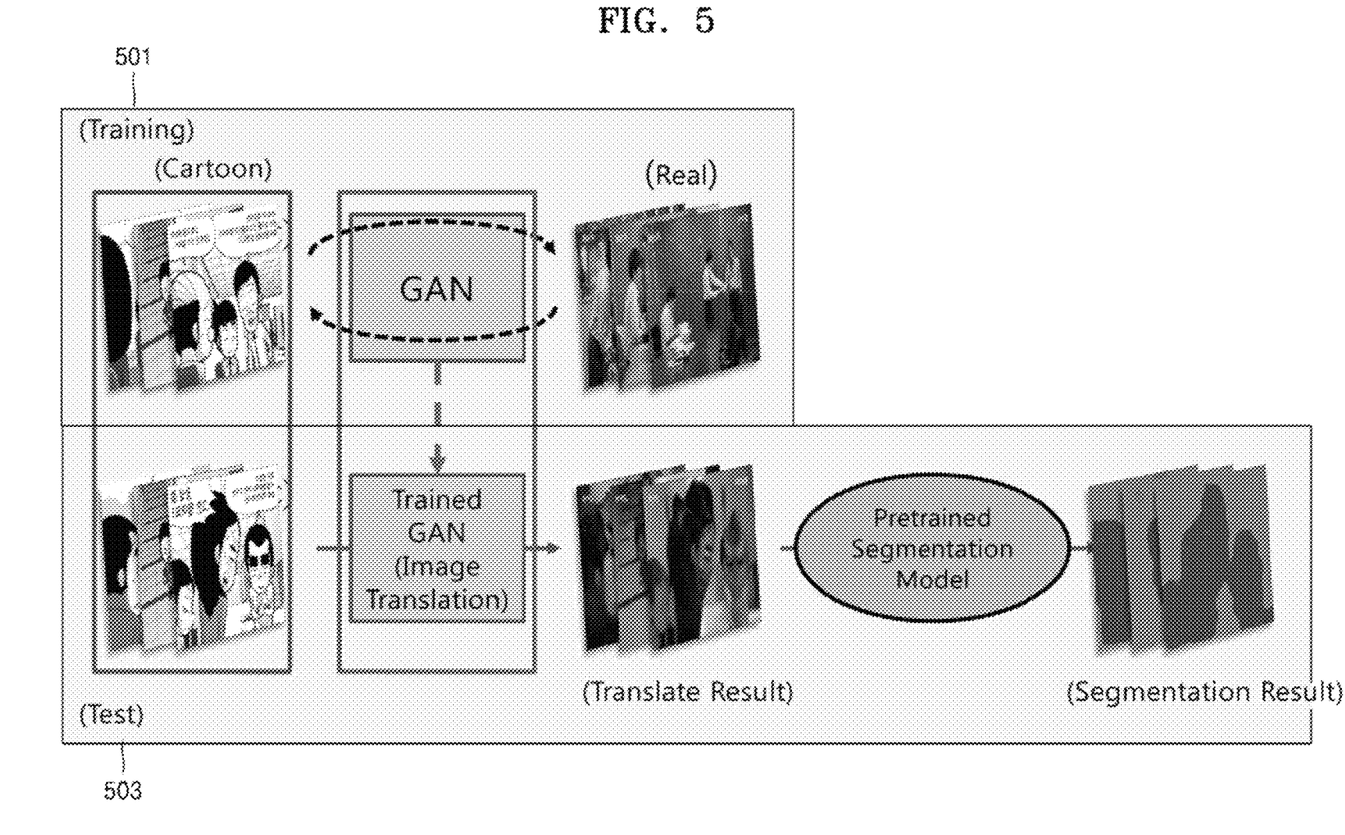
FIG. 5 is a view for describing learning for conversion between heterogeneous domain data and operation for performing the conversion, according to an embodiment of the disclosure.

FIG. 5 is a view for describing learning for conversion between heterogeneous domain data and operation for performing the conversion, according to an embodiment of the disclosure.

In an embodiment of the disclosure, in FIG. 5, a system for converting between heterogeneous domain data may include a training operation 501 and a test operation 503.

In an embodiment of the disclosure, in the training operation 501, learning of a GAN may be performed by using an unpaired training data set. The GAN of FIG. 5 may include a first GAN for converting a first domain to a second domain, and a second GAN for reconverting the second domain to the first domain. The first GAN and the second GAN may be the same GAN. Furthermore, the GAN of FIG. 5 may be CycleGAN.

Referring to FIG. 5, the unpaired training data set may be a set of cartoon images and real picture images. Learning of the GAN may be performed such that using the unpaired training data set, an image in the cartoon domain is converted to an image in the real picture domain and an image in the real picture domain is converted to an image in the cartoon domain.

Throughout the specification, the term 'learning' may be suitably replaced by the term 'training'. For example, when it is said that learning of a network is performed, it means that a network performs learning or the network is trained.

In an embodiment of the disclosure, in the test operation 503, a cartoon image may be converted to a real picture image by using a trained GAN. Furthermore, the converted real picture image may be input to a segmentation model (network) for segmentation. The segmentation model may be a pre-trained segmentation model.

In an embodiment of the disclosure, segmentation may be separating an object in an image. For example, segmentation may separate a person in an image from the background or from other objects. The disclosure provides a method of training a GAN for converting between heterogeneous domain data to increase accuracy in segmentation.

Figure 6:
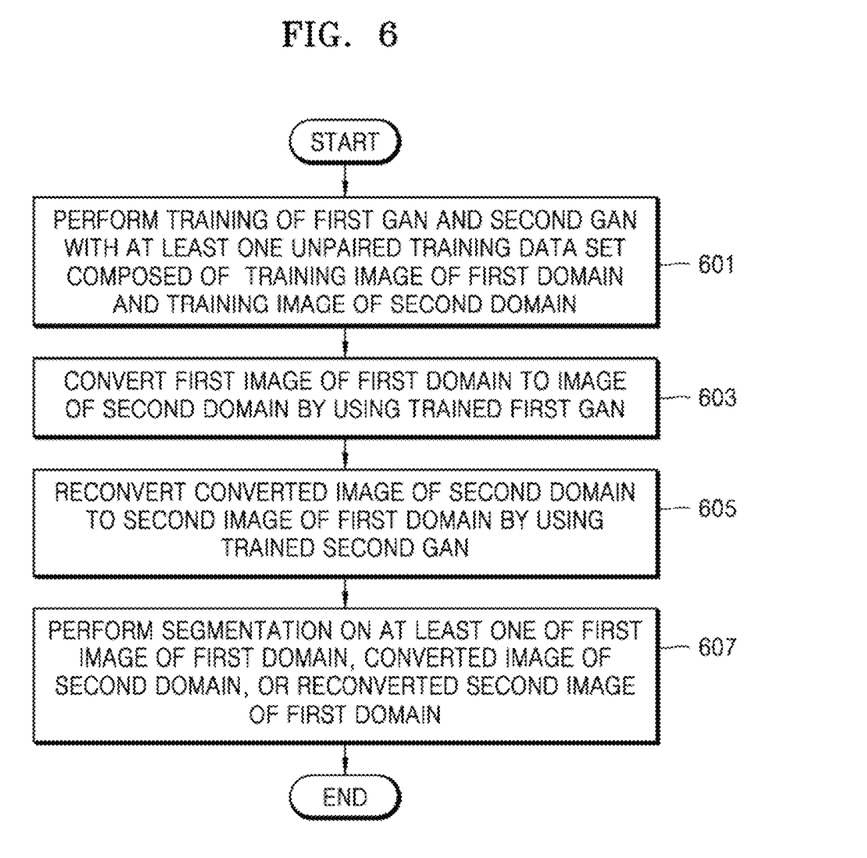
FIG. 6 is a flowchart of a method of training a GAN for converting between heterogeneous domain data, according to an embodiment of the disclosure.

FIG. 6 is a flowchart of a method of training a GAN for converting between heterogeneous domain data, according to an embodiment of the disclosure.

In the disclosure, a device may refer to a system itself for converting between heterogeneous domain data or a device for controlling the system.

In operation 601, the device may train the first GAN and the second GAN with at least one unpaired training data set including training images of a first domain and training images of a second domain.

In an embodiment of the disclosure, the training images of the first domain may be cartoon images, and the training images of the second domain may be real picture images. The types of the domains are not limited thereto, and the term 'domain' may refer to a category that may be distinguished by a certain feature.

In an embodiment of the disclosure, the first GAN and the second GAN may be the same GAN. Furthermore, the first GAN and the second GAN may both be CycleGAN. Moreover, the first GAN and the second GAN may each include a generator (a generative network) and a discriminator (a discriminative network).

In an embodiment of the disclosure, the same unpaired training data set or different unpaired training data sets may be used for training the first GAN and the second GAN.

In operation 603, the device may use the first GAN to convert a first image of the first domain to an image of the second domain.

In an embodiment of the disclosure, the first image of the first domain may be a cartoon image, and the image of the second domain may be a real picture image. The types of the domains are, of course, not limited thereto.

In an embodiment of the disclosure, the first image of the first domain may have a one-to-one mapping relationship with the image of the second domain. Furthermore, the first image of the first domain may have an unpaired image relationship with the image of the second domain.

In operation 605, the device may reconvert the converted image of the second domain to a second image of the first domain by using the trained second GAN.

In an embodiment of the disclosure, the first image of the first domain may have a one-to-one mapping relationship with the second image of the first domain. In this case, the second image of the first domain may be the same as or may be different from the first image of the first domain.

In operation 607, the device may perform segmentation on at least one of the first image of the first domain, the converted image of the second domain, or the reconverted second image of the first domain.

In an embodiment of the disclosure, segmentation may be separating an object in an image. For example, segmentation may separate a person in an image from the background or from other objects.

In an embodiment of the disclosure, training of the first GAN and the second GAN may be controlled based on a result of the segmentation. Specifically, training of the first GAN and the second GAN may be controlled according to a loss function based on a result of performing the segmentation. The device may control training of the first GAN and the second GAN by cumulatively updating parameters of a loss function of at least one of the overall system, the first GAN or the second GAN based on the result of performing the segmentation.

In an embodiment of the disclosure, the loss function may refer to a function to control a loss of a model (network) for a direction targeted by the system (or device), and may include various parameters.

In an embodiment of the disclosure, the device may perform segmentation on the first image of the first domain and the converted image of the second domain, and the loss function for controlling training of the first GAN and the second GAN may be a function that considers a result of comparison between a result of segmentation of an image of the first domain and a result of segmentation of an image of the second domain.

In an embodiment of the disclosure, the device may control training of the first GAN and the second GAN to increase a difference between a result of segmentation of the first image of the first domain and a result of segmentation of the converted image of the second domain.

In an embodiment of the disclosure, the device may control training of the first GAN and the second GAN by additionally considering a loss function of at least one of the first GAN or the second GAN. Specifically, the device may control training of the first GAN and the second GAN based on a loss function of the overall system for converting between heterogeneous domain data in consideration of a loss function of the first GAN based on the generator and the discriminator of the first GAN and a loss function of the second GAN based on the generator and the discriminator of the second GAN.

Furthermore, in an embodiment of the disclosure, the device performs segmentation on the first image of the first domain and the reconverted second image of the first domain, and the loss function for controlling training of the first GAN and the second GAN may be a function that considers a result of comparison between a result of segmentation of the first image of the first domain and a result of segmentation of the reconverted second image of the first domain.

Moreover, in an embodiment of the disclosure, the device may control training of the first GAN and the second GAN to reduce a difference between a result of segmentation of an image of the first domain and a result of segmentation of the reconverted second image of the first domain.

In an embodiment of the disclosure, the device may control training of the first GAN and the second GAN by additionally considering a loss function of at least one of the first GAN or the second GAN. This corresponds to what is described above, so the detailed description thereof will not be repeated.

Moreover, in an embodiment of the disclosure, the device may control training of the first GAN and the second GAN not to apply a loss function that is based on a result of comparison between the first image of the first domain and the reconverted second image of the first domain. In other words, the device may control training of the first GAN and the second GAN not to consider the aforementioned cycle consistency of CycleGAN. This will now be described in more detail in connection with FIG. 7.

Furthermore, in an embodiment of the disclosure, the device performs segmentation on the first image of the first domain, the converted image of the second domain, and the reconverted second image of the first domain. The loss function for controlling training of the first GAN and the second GAN may be a function that considers both a first result of comparison between a result of segmentation of the first image of the first domain and a result of segmentation of the image of the second domain and a second result of comparison between a result of segmentation of the first image of the first domain and a result of segmentation of the reconverted second image of the first domain.

Moreover, in an embodiment of the disclosure, the device may control training of the first GAN and the second GAN to increase a difference between a result of segmentation of the first image of the first domain and a result of segmentation of the image of the second domain and reduce a difference between a result of segmentation of the image of the first domain and a result of segmentation of the reconverted second image of the first domain.

Furthermore, in an embodiment of the disclosure, the device may control training of the first GAN and the second GAN by additionally considering loss functions of the first GAN and the second GAN. Moreover, the device may control training of the first GAN and the second GAN not to apply a loss function that is based on a result of comparison between the first image of the first domain and the reconverted second image of the first domain. This corresponds to what is described above, so the detailed description thereof will not be repeated.

Figure 7:
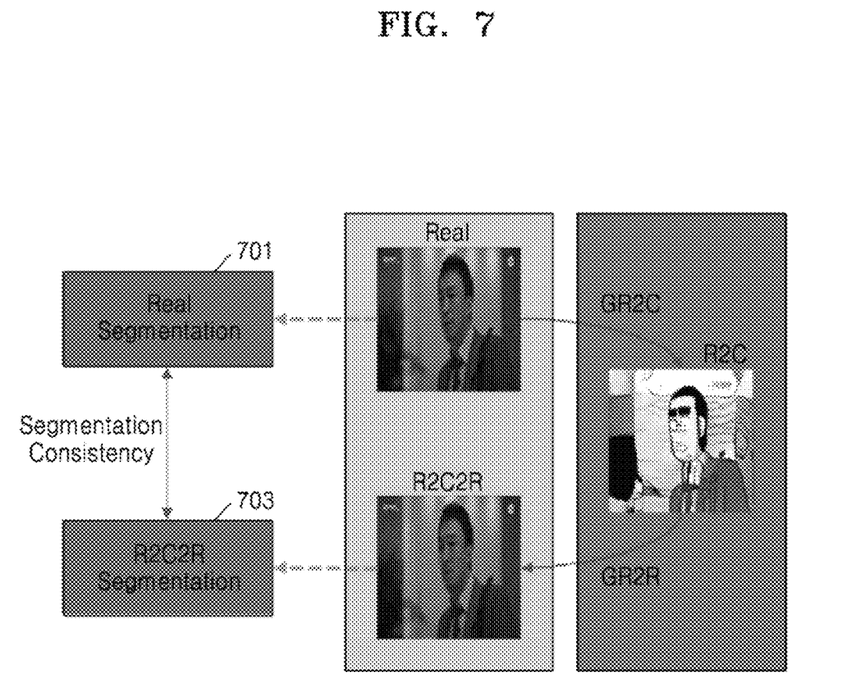
FIGS. 7 and 8 are views for describing a loss function of a GAN for converting between heterogeneous domain data, according to an embodiment of the disclosure.
Figure 8:
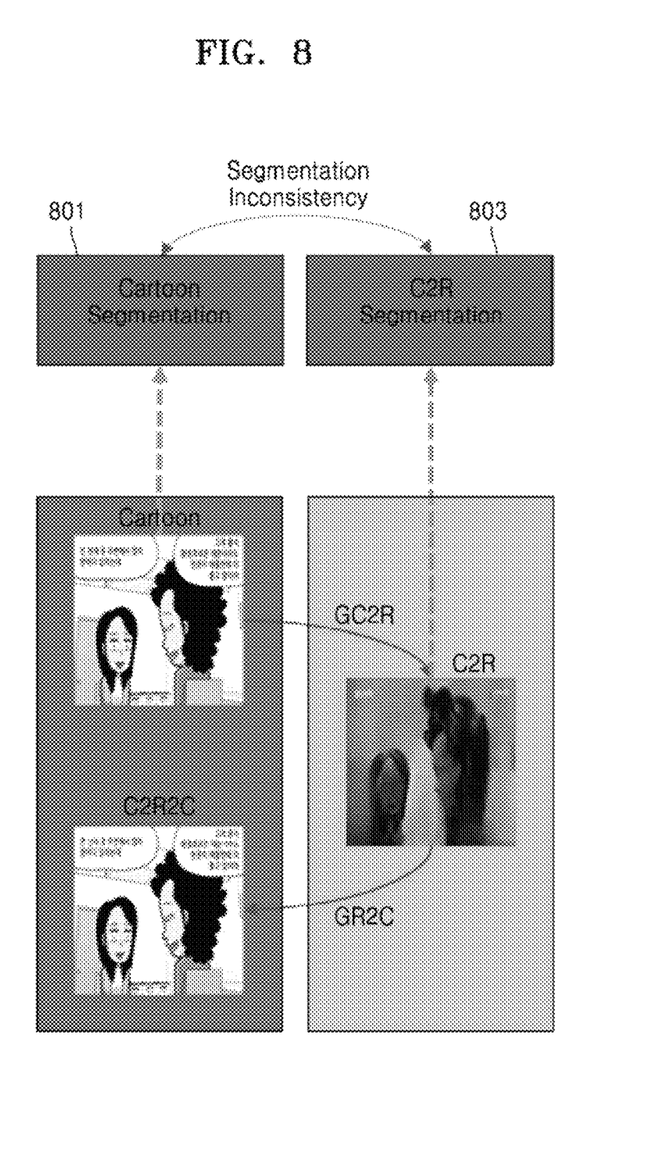

FIGS. 7 and 8 are views for describing a loss function of a GAN for converting between heterogeneous domain data, according to an embodiment of the disclosure.

As described above, a loss function of an overall system for converting heterogeneous domain data may be based on a result of segmentation.

Referring to FIG. 7, a device may control training of a system or a GAN in the system based on consistency between a result of segmentation of an image of the first domain before conversion, i.e., Real Segmentation, 701 and a result of segmentation of an image reconverted into the first domain from an image converted into the second domain, i.e., R2C2R Segmentation, 703.

Referring to FIG. 8, a device may control training of a system or a GAN in the system based on inconsistency between a result of segmentation of an image of the first domain before conversion, i.e., Cartoon Segmentation, 801 and a result of segmentation of an image converted into the second domain, i.e., C2R Segmentation, 803.

Furthermore, the device may control training of the system or the GAN in the system by considering both consistency as in FIG. 7 and inconsistency as in FIG. 8.

The conventional CycleGAN controls learning based on a loss function for cycle consistency (Cycle Consistency Loss) between an image of the first domain before conversion and an image resulting from reconversion of the image converted into the second domain into the first domain.

The loss function of the conventional CycleGAN is expressed as in the following equation 1:

$$\text{Total\_Loss} = \text{GAN}\_A\_\text{Loss} + \text{GAN}\_B\_\text{Loss} + \text{Cycle}\_A\_\text{Loss} + \text{Cycle}\_B\_\text{Loss}$$

$$\text{Cycle}\_A\_\text{Loss} = |\text{Real} - R2C2R|$$

$$\text{Cycle}\_B\_\text{Loss} = |\text{Cartoon} - C2R2C| \qquad (1)$$

where GAN_A Loss and GAN_B Loss denote loss functions of the GAN in the system, Cycle_A Loss denotes a difference between a real picture image and an image resulting from reconversion from a cartoon converted from the real picture image back to the real picture image, and Cycle_B Loss denotes a difference between a cartoon image and an image resulting from reconversion from a real picture image converted from the cartoon image back to the cartoon image.

The loss function for cycle consistency is used to maintain edges of a first domain image (an original image) before conversion. In the disclosure, however, to further increase accuracy in segmentation, learning of the system or the GAN in the system may be controlled according to a segmentation-result based loss function, leaving out the loss function for cycle consistency (Cycle Consistency Loss).

In embodiments of the disclosure, SCL (Segmentation Consistency Loss)=MIN(Real Segmentation—R2C2R Segmentation) to minimize the result of segmentation of the real picture image and a result of segmentation of the image resulting from reconversion from an image converted into the cartoon domain back to the real picture image as described above in connection with FIG. 7 and SIL (Segmentation Inconsistency Loss)=MAX(Cartoon Segmentation—C2R Segmentation) to maximize the result of segmentation of the cartoon image and a result of segmentation of the converted real picture image as described above in connection with FIG. 8 may be used as loss functions.

The loss functions of the system in the disclosure may be expressed as in the following equation 2 or 3:

Total_Loss=GAN_A_Loss+GAN_B_Loss+(SCL/SIL)

Seg(A): a result of segmentation of A

SCL=|Seg(Real)−Seg(R2C2R)|

SIL=|Seg(Cartoon)−Seg(C2R)|   (2)

Total_Loss=GAN_A_Loss+GAN_B_Loss+(SCL−SIL)

Seg(A): a result of segmentation of A

SCL=|Seg(Real)−Seg(R2C2R)|

SIL=|Seg(Cartoon)−Seg(C2R)|   (3)

The loss functions are not limited to the above equations, and only one of SCL and SIL may be used in some embodiments of the disclosure. Furthermore, operation between SCL and SIL is not limited to subtraction and division as in the above equations but may be operation based on a certain function.

Specifically, accuracy in segmentation may be increased by controlling training of the GAN to increase a difference in segmentation between an original image before conversion and a converted image in order to accurately perform segmentation on the converted image even though segmentation of the original image is not accurately performed, through SIL, and controlling training of the GAN to reduce a difference in segmentation between the original image before conversion and an image resulting from reconversion after conversion, through SCL.

Furthermore, although the conventional technology needs to separately control training for conversion between heterogeneous domain data and training for segmentation, the system in accordance with an embodiment of the disclosure uses a loss function that uses a result of segmentation and thus insert the segmentation to a training model, thereby performing training and operation for conversion and segmentation by one process.

Figure 9:
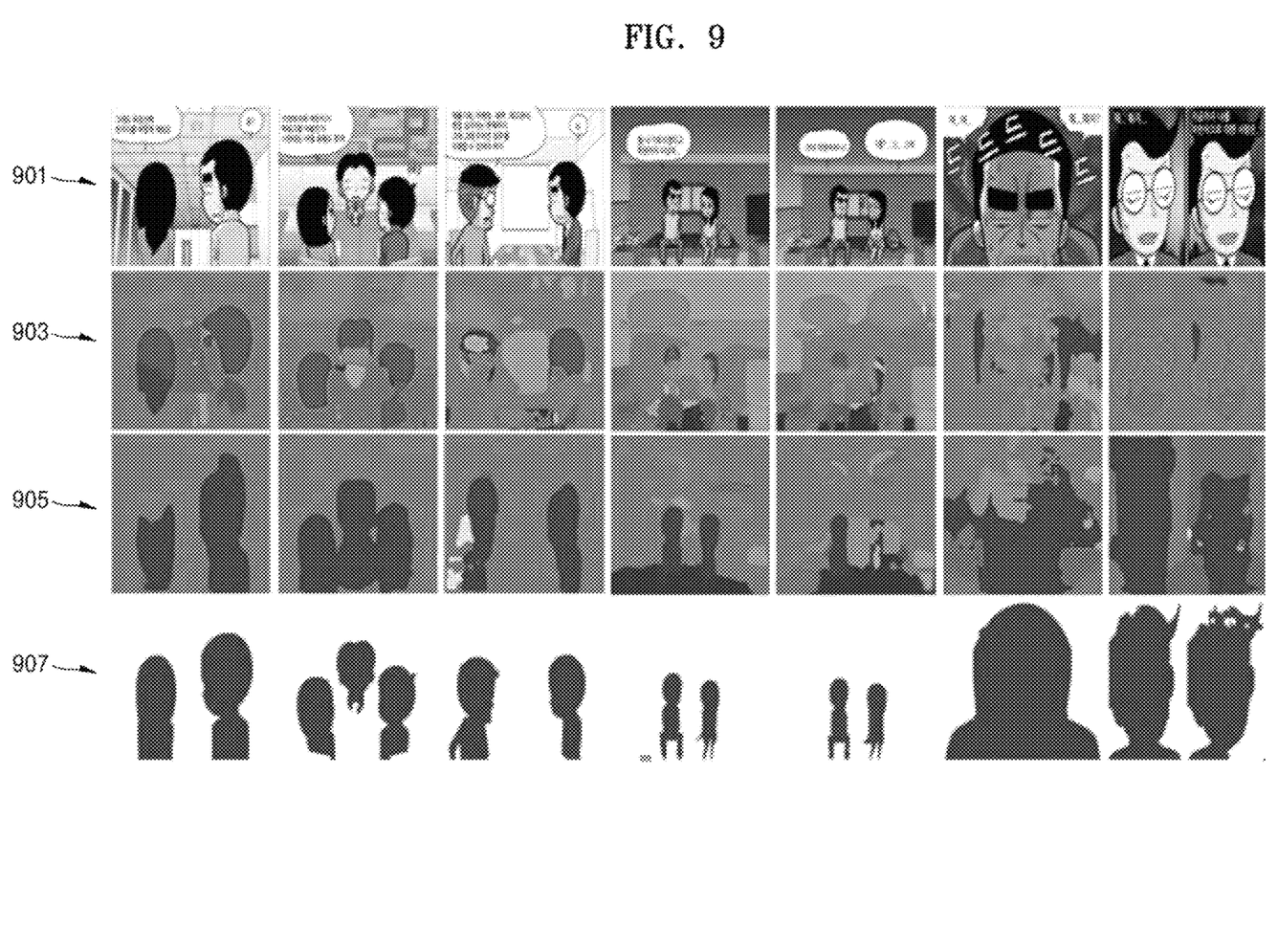
FIG. 9 shows results of conversion between heterogeneous domain data and segmentation, according to an embodiment of the disclosure.

FIG. 9 shows results of conversion between heterogeneous domain data and segmentation, according to an embodiment of the disclosure, which may be performed by a system for converting between heterogeneous domain data.

Referring to FIG. 9, a first line 901 represents original images (cartoon images), a second line 903 represents results of segmentation of the original images, a third line 905 represents results of segmentation using the system for converting heterogeneous domain data according to the disclosure, and a fourth line 907 represents ground truth segmentation of the original images (cartoon images).

The images shown in FIG. 9 are adjusted to have the 256×256 size and used for training. The system according to the disclosure trains CycleGAN for 200 epochs, and an initial learning rate is 0.0002 up until 100 epochs, which is reduced by 0.000002 for every epoch. After training, cartoon images in a test set are converted to real images through the trained CycleGAN. For reference, a network model used in this experiment of the system of the disclosure is "ResNet+PSPNet" architecture that has been trained with MIT ADE20K dataset.

As shown in FIG. 9, it is seen that accurate results are generated through the segmentation model in which the real picture images and converted images are pretrained. On the other hand, referring to the second line 903, it is seen that the cartoon images before image conversion have not been accurately segmented. Referring to the third line 905, it is seen that the segmentation results according to the system of the disclosure are more accurate than the segmentation of the cartoon images.

Quantitative evaluation of the experimental results according to the system of the disclosure is shown as in Table 1. Table 1 shows segmentation accuracy of a human object in a test image based on mean intersection over union (IOU) and pixel accuracy. The mean IOU before image conversion is merely 19.46% but increases to 55.05% after conversion, and the pixel accuracy is 73.13% before conversion and increases to 81.12% after conversion.

TABLE 1

| Segmentation | Images | |
| --- | --- | --- |
| Accuracy | Original | After Conversion |
| Mean IoU | 19.46% | 55.05% |
| Pixel Accuracy | 73.13% | 81.12% |

Figure 10:
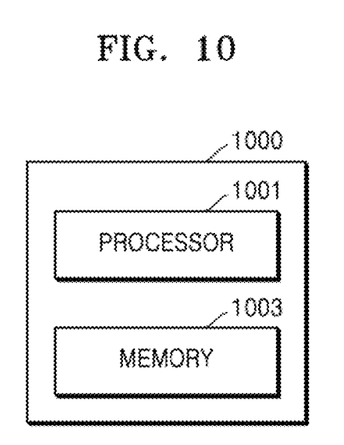
FIG. 10 is a block diagram of a device for controlling training of a GAN for performing conversion between heterogeneous domains, according to an embodiment of the disclosure.

FIG. 10 is a block diagram of a device for controlling training of a GAN for performing conversion between heterogeneous domains, according to an embodiment of the disclosure.

As shown in FIG. 10, a device 1000 of the disclosure may include a processor 1001 and a memory 1003. Elements of the device 1000 are not, however, limited thereto. For example, the device 1000 may include more or fewer elements than described above. Furthermore, there may be at least one processor 1001 and at least one memory 1003. Moreover, the processor 1001 and the memory 1003 may be combined into a single chip.

In an embodiment of the disclosure, the processor 1001 may perform training of a GAN with an unpaired training data set comprised of training images of a first domain and training images of a second domain, and with the trained GAN, convert a first image of the first domain to an image of the second domain and perform segmentation on at least one of the image of the first domain or the image of the second domain.

In an embodiment of the disclosure, the processor 1001 may perform segmentation on the first image of the first domain and the converted image of the second domain.

In an embodiment of the disclosure, the processor 1001 may control training of the first GAN and the second GAN to increase a difference between a result of segmentation of the first image of the first domain and a result of segmentation of the converted image of the second domain.

In an embodiment of the disclosure, the processor 1001 may control training of the first GAN and the second GAN by additionally considering a loss function of at least one of the first GAN or the second GAN.

In an embodiment of the disclosure, the processor 1001 may perform segmentation on the first image of the first domain and the reconverted second image of the first domain.

Moreover, in an embodiment of the disclosure, the processor 1001 may control training of the first GAN and the second GAN to reduce a difference between a result of segmentation of an image of the first domain and a result of segmentation of the reconverted second image of the first domain.

In an embodiment of the disclosure, the processor 1001 may control training of the first GAN and the second GAN by additionally considering a loss function of at least one of the first GAN or the second GAN.

In an embodiment of the disclosure, the processor 1001 may perform segmentation on the first image of the first domain, the converted image of the second domain, and the reconverted second image of the first domain.

Moreover, in an embodiment of the disclosure, the processor 1001 may control training of the first GAN and the second GAN to increase a difference between a result of segmentation of the first image of the first domain and a result of segmentation of the image of the second domain and reduce a difference between a result of segmentation of the image of the first domain and a result of segmentation of the reconverted second image of the first domain.

In an embodiment of the disclosure, the processor 1001 may control training of the first GAN and the second GAN by additionally considering loss functions of the first GAN and the second GAN.

In an embodiment of the disclosure, the processor 1001 may control training of the first GAN and the second GAN not to apply a loss function that is based on a result of comparison between the first image of the first domain and the reconverted second image of the first domain.

In an embodiments of the disclosure, the memory 1003 may store a program and data required for operation of the device 1000.

Furthermore, the memory 1003 may store at least one of data generated or data obtained by the processor 1001. For example, the memory 1003 may store a training data set, a segmentation result, a loss function, etc. The memory 1003 may also store a weight vector set.

The memory 1003 may include a storage medium such as a read only memory (ROM), a random access memory (RAM), a hard disk, a compact disc ROM (CD-ROM), and a digital versatile disc (DVD), or a combination of storage mediums.

According to embodiments of the disclosure, training a GAN for converting between heterogeneous domains may be efficiently controlled, and accuracy of which may be increased.

The effects according to the disclosure are not limited thereto, and throughout the specification it will be clearly appreciated by those of ordinary skill in the art that there may be other effects unmentioned.

Several embodiments of the disclosure have been described, but a person of ordinary skill in the art will understand and appreciate that various modifications can be made without departing the scope of the disclosure. Thus, it will be apparent to those ordinary skilled in the art that the disclosure is not limited to the embodiments described, which have been provided only for illustrative purposes. Furthermore, the embodiments of the disclosure may be operated by being combined with one another if necessary.

What is claimed is:

1. A method of training a generative adversarial network (GAN) for converting between heterogeneous domains, the method comprising:
    training a first GAN and a second GAN with at least one unpaired training data set comprised of a training image of a first domain and a training image of a second domain;
    using the trained first GAN to convert a first image of the first domain to an image of the second domain;
    using the trained second GAN to reconvert the converted image of the second domain to a second image of the first domain; and
    performing segmentation on two or more of the first image of the first domain, the converted image of the second domain, or the reconverted second image of the first domain,
    wherein the training of the first GAN and the second GAN is controlled according to a loss function based on a result of comparison between the segmentations performed,
    wherein the performing of the segmentation comprises:
    performing segmentation on the first image of the first domain, the converted image of the second domain, and the reconverted second image of the first domain,
    wherein the loss function comprises:
    a function which considers both a first result of comparison between a result of segmentation of the first image of the first domain and a result of segmentation of the converted image of the second domain, and a second result of comparison between the result of segmentation of the first image of the first domain and a result of segmentation of the reconverted second image of the first domain, and
    wherein the training of the first GAN and the second GAN comprises:
    controlling training of the first GAN and the second GAN to increase a difference between the result of segmentation of the first image of the first domain and the result of segmentation of the converted image of the second domain and reduce a difference between the result of segmentation of the first image of the first domain and the result of segmentation of the reconverted second image of the first domain.

2. The method of claim 1, wherein the training of the first GAN and the second GAN comprises
    controlling training of the first GAN and the second GAN by additionally considering a loss function of at least one of the first GAN or the second GAN.

3. The method of claim 1, wherein the training of the first GAN and the second GAN comprises
    controlling training of the first GAN and the second GAN by additionally considering a loss function of at least one of the first GAN or the second GAN.

4. The method of claim 1, wherein the training of the first GAN and the second GAN comprises
    controlling training of the first GAN and the second GAN not to apply a loss function based on a result of comparison between the first image of the first domain and the reconverted second image of the first domain.

5. The method of claim 1, wherein the performing of the segmentation comprises performing the segmentation using a segmentation network adapted to the first domain and the second domain.

6. The method of claim 1, wherein the training of the first GAN and the second GAN comprises controlling training of the first GAN and the second GAN by additionally considering loss functions of the first GAN or the second GAN.

7. The method of claim 1, wherein the first GAN and the second GAN correspond to CycleGAN.

8. The method of claim 1, wherein the first GAN and the second GAN each comprise a generator and a discriminator, and wherein the first GAN and the second GAN are the same.

9. A device for controlling a generative adversarial network (GAN) for converting between heterogeneous domains, the device comprising:

a memory; and a processor configured to train the GAN with an unpaired training data set comprised of a training image of a first domain and a training image of a second domain, convert a first image of the first domain to an image of the second domain, reconvert the converted image of the second domain to a second image of the first domain by using the trained GAN, and perform segmentation on two or more of the first image of the first domain, the converted image of the second domain or the reconverted second image of the first domain, wherein the processor is further configured to control training of the GAN according to a loss function based on a result of comparison between the segmentations performed, wherein the performing of the segmentation comprises:

performing segmentation on the first image of the first domain, the converted image of the second domain, and the reconverted second image of the first domain, wherein the loss function comprises:

a function which considers both a first result of comparison between a result of segmentation of the first image of the first domain and a result of segmentation of the converted image of the second domain, and a second result of comparison between the result of segmentation of the first image of the first domain and a result of segmentation of the reconverted second image of the first domain, and wherein the training of the GAN comprises:

controlling training of the GAN to increase a difference between the result of segmentation of the first image of the first domain and the result of segmentation of the converted image of the second domain and reduce a difference between the result of segmentation of the first image of the first domain and the result of segmentation of the reconverted second image of the first domain.

* * * * *